(12) United States Patent
Deurbrouck et al.

(10) Patent No.: US 10,498,719 B2
(45) Date of Patent: *Dec. 3, 2019

(54) BROWSER PLUG-IN FOR SECURE CREDENTIAL SUBMISSION

(71) Applicant: Microsoft Technology Licensing, LLC, Redmond, WA (US)

(72) Inventors: John Deurbrouck, Remond, WA (US); Caleb G. Baker, Seattle, WA (US); Danhua Zhu, Redmond, WA (US); Colin Leslie Dellow, Redmond, WA (US); Roberto A. Franco, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/952,461

(22) Filed: Apr. 13, 2018

(65) Prior Publication Data

US 2018/0234406 A1   Aug. 16, 2018

Related U.S. Application Data

(63) Continuation of application No. 14/816,212, filed on Aug. 3, 2015, now Pat. No. 9,954,838, which is a continuation of application No. 12/489,435, filed on Jun. 23, 2009, now Pat. No. 9,124,566.

(51) Int. Cl.
*H04L 29/06* (2006.01)
*H04L 29/08* (2006.01)
*G06F 17/30* (2006.01)
*G06F 16/958* (2019.01)

(52) U.S. Cl.
CPC .......... *H04L 63/08* (2013.01); *G06F 16/986* (2019.01); *H04L 63/168* (2013.01); *H04L 67/02* (2013.01)

(58) Field of Classification Search
CPC ....... H04L 63/08; H04L 63/168; H04L 67/02; G06F 17/30896
See application file for complete search history.

(56) References Cited

U.S. PATENT DOCUMENTS

| | | | | |
|---|---|---|---|---|
| 7,409,710 B1 * | 8/2008 | Uchil | .................. | H04L 63/08 713/155 |
| 8,266,306 B2 * | 9/2012 | Newstadt | ............... | G06F 21/31 709/201 |
| 8,407,576 B1 * | 3/2013 | Yin | ...................... | G06F 3/0481 715/206 |
| 9,124,566 B2 * | 9/2015 | Deurbrouck | ............ | H04L 63/08 |
| 9,954,838 B2 * | 4/2018 | Deurbrouck | ............ | H04L 63/08 |
| 2009/0205014 A1 * | 8/2009 | Doman | .................. | G06F 21/34 726/1 |
| 2010/0223664 A1 * | 9/2010 | Naranjo | ................ | G06F 3/048 726/10 |

* cited by examiner

*Primary Examiner* — Mohammad A. Siddiqi

(57) ABSTRACT

Described is a technology by which a plug-in (e.g., an ActiveX® control) instantiated by a web browser calls functions of a credential service to use a set of credential data (e.g., a card file) for logging into a website. If the credential service determines that a previously used card file for the website exists, a representation of that card file is displayed in the browser, and the data of that card file is used to obtain a token for logging in the user. If not found, an icon is presented instead, by which the user can select a user interface that allows selection of another card file that meets that meet the website's requirements.

20 Claims, 3 Drawing Sheets

BROWSER PLUG-IN FOR SECURE CREDENTIAL SUBMISSION

CROSS-REFERENCE TO RELATED APPLICATIONS

The application is a continuation of, claims the benefit of and priority to, previously filed U.S. patent application Ser. No. 14/816,212 entitled "BROWSER PLUG-IN FOR SECURE CREDENTIAL SUBMISSION" filed on Aug. 3, 2015, which is a continuation of, claims the benefit of and priority to, previously filed U.S. patent application Ser. No. 12/489,435 entitled "BROWSER PLUG-IN FOR SECURE CREDENTIAL SUBMISSION" filed on Jun. 23, 2009, the subject matter of which are hereby incorporated herein by reference in their respective entireties.

BACKGROUND

Many websites require user credentials. At the same time, users may have different credentials for different websites and other purposes.

Presenting credentials stored on a computer to a website can cause issues with users. For example, if the credentials are selected and presented to a website entirely outside the browser with which the user is accessing the website, it is often difficult for the user to associate the submission tool with the site. If the credentials are selected and presented within the browser, the user may feel the site already possesses and has access to all of the user's credentials.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a plug-in (e.g., an ActiveX® control) instantiated by a web browser calls functions of a credential service, including to determine whether a set of credential metadata (e.g., a card file) matches a website's credential requirements (required "claims"). If so, the plug-in calls a credential service function obtain a token corresponding to the set of credential data, for providing to the website, e.g., to login the user.

In one aspect, the plug-in displays a representation of the card file, e.g., so that the user recognizes the association between the website and that set of user credentials. If a card file previously used with the website is not found, an icon is presented instead, by which the user can select a user interface that allows selection of another card file that meets the website's requirements.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards the presentation of credential data in context of the web page, in a manner that allows submission of the credentials without disclosing credential metadata to the web page. To this end, a browser plug-in (e.g., an ActiveX® control or NPAPI, Netscape Plugin Application Programming Interface) handles communication with a credential service to securely obtain a token, while appearing in context on the web page. This isolates the secure data from the web page, yet displays information in the context of the web page that allows the user to choose a credential to submit.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and networking in general.

Figure 1:
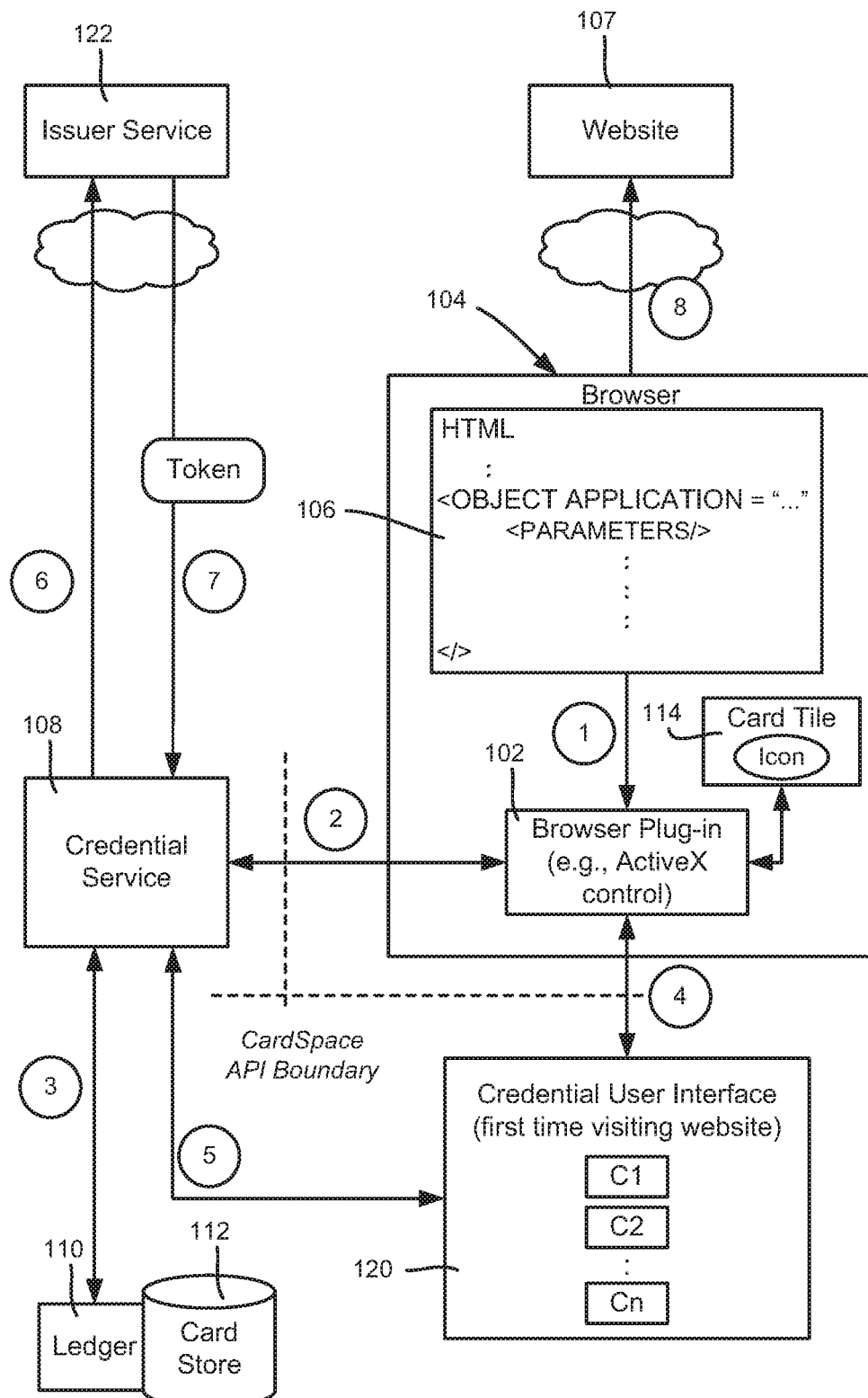
FIG. 1 is a block diagram representing an example architecture for secure credential submission as directed by a browser plug-in control.

Turning to FIG. 1, there is shown a set of components that facilitate secure credential submission via a browser plug-in 102 of a browser 104. In one implementation, the browser plug-in is an ActiveX® control, instantiated via an OBJECT tag in the HTML 106 of a website 107 or the like rendered by the browser 104. The OBJECT tag specifies the nature of the required credential, and the object ID of the ActiveX® control. On instantiation, as represented in FIG. 1 via the arrow labeled one (1), the browser plug-in 102 determines how it is to appear to the user from information in the OBJECT tag, e.g., various parameters.

As represented in FIG. 1 via the arrow labeled two (2), the browser plug-in 102 queries a credential service 108 (e.g., a CardSpace service) for data to be rendered in the web page. To find such data, the Credential service 108 accesses (the arrow labeled three (3)) a ledger 110 corresponding to a card store 112 to determine whether there is a record of a token being generated as a result a previous visit to the website. Note that the card store contains card files that each contain a set of credential data (data elements) corresponding to some credentials, referred to as "claims" in one implementation. The card file also contains an icon or other graphical image, and may display its claims.

Note that while this process is underway, a card tile 114 (e.g., corresponding to a location identified in the parameters) may display a "busy" graphic or the like, and the plug-in control 102 does not respond to interaction. When complete, an image (a "select" card tile or the user's card for the website) appears in place of the busy indicator, as described below.

Two scenarios are thus possible, one in which the ledger 110 contains no record of a token being generated for this website (or none matching the website's current policy), and one in which a token is found. If there is no record, the plug-in 102 displays the "select" card tile that includes an icon. If the user clicks the icon, (or clicks a Login button that may be provided by the website), in response the user is transitioned to a credential user interface 120, as represented in FIG. 1 by the arrow labeled four (4). Note that the web page can invoke functions including to invoke the credential user interface 120 for selection as described below.

The credential user interface 120 searches for card files that contain claims matching the website's requirements. Those that are found are presented to the user, where the user can select one. If none are found, the credential user interface 120 gives the user an opportunity to create a card.

In the other scenario, the ledger 110 contains a record of having previously generated a token matching this website/its policy. In the card tile 114, the user sees a card containing a representation of the previously-submitted card, e.g., a graphic and the card's claims. Note that when the card is moused over, the card name may be displayed.

The login takes place by generating and releasing a token to the website. Note that the web page can invoke a function that causes a token to be generated. During token generation the site may display its own graphic as a progress indicator. Token generation (e.g., by an issuer service 122) is represented in FIG. 1 via the arrows labeled 6 and seven (7);

Selection of a card or finding a previous card may automatically log in the user to the website. Alternatively, the user may click a login button, which generates and releases the token to the site.

Note that because of the API architecture, the credential service is unavailable to script code running in the browser, and the user's credentials cannot be obtained via scripting. Further, no credentials are collected within the browser, and there is no card (claim data) editing within the browser.

Figure 2:
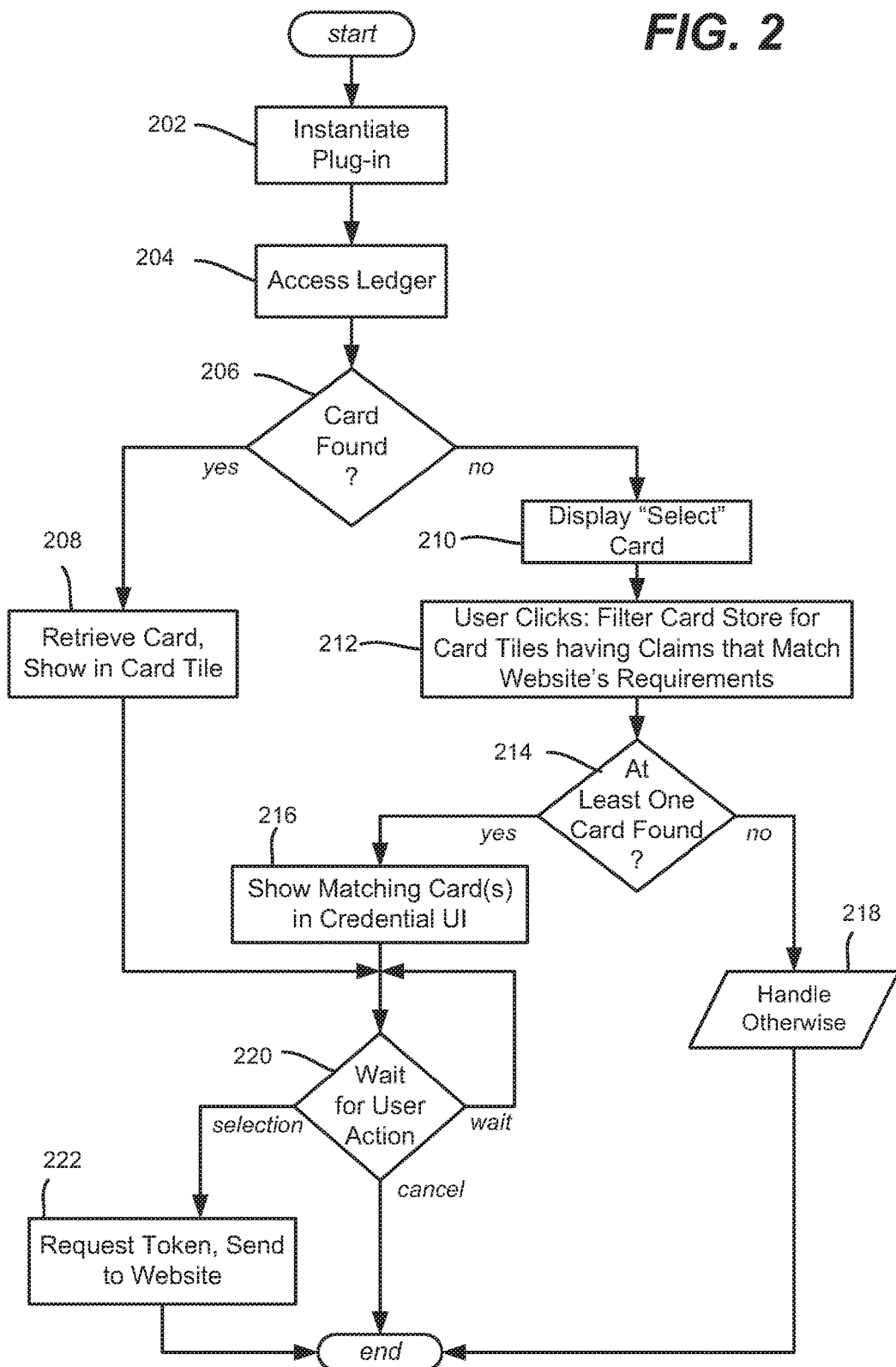
FIG. 2 is a flow diagram exemplifying steps taken to obtain and submit a token corresponding to a set of credential data from a client computing device to a website.

FIG. 2 shows example steps, beginning at step 202 where the plug-in control 102 is instantiated during page loading by the browser. This includes examining the OBJECT tag for claims that the website requires, and to support chaining. At this time the resolution process is started to facilitate card matching via the Credential service 108 that is external to the control, e.g., an operating system component that is accessible via an API. During this time, a "Busy" indication may be displayed in the card image, with the "click on card" and the GetToken( ) interface disabled.

Step 206 represents determining whether a card that matches the website's policy/claims was found. If so, step 208 provides the card to the browser plug-in to display the card in the card tile, including its graphic (or a default graphic if none). If not found, the "select" card, which indicates it is clickable to select a card, is displayed at step 210. At this time, the card tile is enabled for clicking, and the GetToken( ) interface may be invoked. If the user clicks, (step 212), the card store is accessed to find any cards matching the site's claim requirements. If at least one is found (step 214), the card or cards are displayed to the user for selection at step 216; if not found, step 218 handles otherwise, e.g., asks the user to create one.

At this point, the process may need user interaction, such as to click on the card in the card tile or to select a card in the credential user interface, as represented by step 220. A user may also select a "login" icon or the like provided by the website. Note that a card may be designated in the ledger for automatic submission for this set of policy, which event selection is automatically chosen without needing user interaction.

Step 222 represents requesting of the token and sending it to the website. Note that this may be accomplished by sending an event to the website, (which the website handles via script), whereby the web page invokes the function to get the token, e.g., GetToken( ) using the card in the card tile, or by asking the credential user interface for the selection. When the function is called, the website is notified that token generation is under way. Note that step 222 includes waiting for a completed token. It is also feasible to cancel the request, e.g., due to error in token generation or a user cancel at a suitable prompt.

When a token is received, completed, and this is a subsequent submission with no previously un-submitted claims, the token is submitted to the website. Otherwise, a review claims page may be provided, which if it returns YES, submits the token to the website, or if NO (or is canceled), returns to await some user action.

Exemplary Operating Environment

Figure 3:
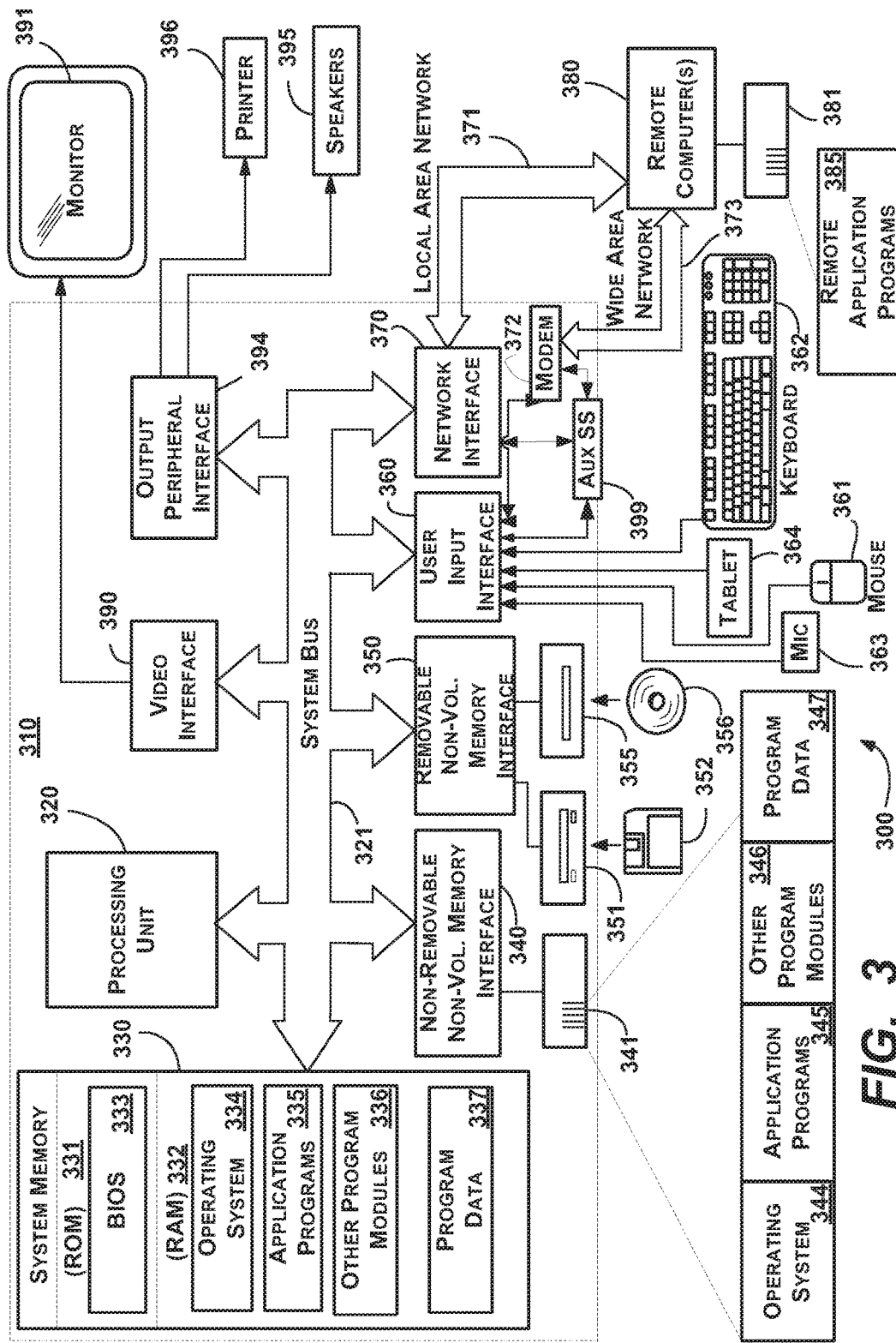
FIG. 3 shows an illustrative example of a computing environment into which various aspects of the present invention may be incorporated.

FIG. 3 illustrates an example of a suitable computing and networking environment 300 into which the examples and implementations of FIGS. 1 and 2 may be implemented. The computing system environment 300 is only one example of a suitable computing environment and is not intended to suggest any limitation as to the scope of use or functionality of the invention. Neither should the computing environment 300 be interpreted as having any dependency or requirement relating to any one or combination of components illustrated in the exemplary operating environment 300.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 3, an exemplary system for implementing various aspects of the invention may include a general purpose computing device in the form of a computer 310. Components of the computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 310 typically includes a variety of computer-readable media. Computer-readable media can be any available media that can be accessed by the computer 310 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 310. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336 and program data 337.

The computer 310 may also include other removable/non-removable, volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media, described above and illustrated in FIG. 3, provide storage of computer-readable instructions, data structures, program modules and other data for the computer 310. In FIG. 3, for example, hard disk drive 341 is illustrated as storing operating system 344, application programs 345, other program modules 346 and program data 347. Note that these components can either be the same as or different from operating system 334, application programs 335, other program modules 336, and program data 337. Operating system 344, application programs 345, other program modules 346, and program data 347 are given different numbers herein to illustrate that, at a minimum, they are different copies. A user may enter commands and information into the computer 310 through input devices such as a tablet, or electronic digitizer, 364, a microphone 363, a keyboard 362 and pointing device 361, commonly referred to as mouse, trackball or touch pad. Other input devices not shown in FIG. 3 may include a joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. The monitor 391 may also be integrated with a touch-screen panel or the like. Note that the monitor and/or touch screen panel can be physically coupled to a housing in which the computing device 310 is incorporated, such as in a tablet-type personal computer. In addition, computers such as the computing device 310 may also include other peripheral output devices such as speakers 395 and printer 396, which may be connected through an output peripheral interface 394 or the like.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3. The logical connections depicted in FIG. 3 include one or more local area networks (LAN) 371 and one or more wide area networks (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360 or other appropriate mechanism. A wireless networking component 374 such as comprising an interface and antenna may be coupled through a suitable device such as an access point or peer computer to a WAN or LAN. In a networked environment, program modules depicted relative to the computer 310, or portions thereof, may be stored in the remote memory storage device. By way of example, and not limitation, FIG. 3 illustrates remote application programs 385 as residing on memory device 381. It may be appreciated that the network connections shown are exemplary and other means of establishing a communications link between the computers may be used.

An auxiliary subsystem 399 (e.g., for auxiliary display of content) may be connected via the user interface 360 to allow data such as program content, system status and event notifications to be provided to the user, even if the main portions of the computer system are in a low power state. The auxiliary subsystem 399 may be connected to the modem 372 and/or network interface 370 to allow communication between these systems while the main processing unit 320 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. An apparatus comprising:
   at least one processor; and
   a memory communicatively coupled to the at least one processor and including:
   a browser component configured to, based upon content corresponding to a website, call functions of a credential service to determine whether a stored set of credential data that matches the website's login requirements is available, and if so, to obtain a token corresponding to the stored set of credential data for providing to the website,
   in response to a determination that no previously used set of credential data matches the website's login requirements, a credential user interface is to display a visible representation to process user selection or creation of another set of credential data, and to obtain a token corresponding to the other set of credential data.

2. The apparatus of claim 1 wherein the browser component comprises an ActiveX.RTM.control or NPAPI component.

3. The apparatus of claim 1 wherein the browser component is identified in HTML content, and is associated with parameters including information that corresponds to the website's login requirements.

4. The apparatus of claim 1 wherein the set of credential data comprises a card file maintained in a card store.

5. The apparatus of claim 4 wherein the browser component is further configured to display a visible representation of the card file.

6. The apparatus of claim 1 wherein the credential service is further configured to determine whether a set of credential data that matches the website's login requirements is available by accessing a ledger associated with a card store.

7. The apparatus of claim 1 wherein the code is further configured to provide a select icon when no previously used credential data matches the website's login requirements credential user interface, and wherein the credential user interface is presented when the select icon is clicked.

8. The apparatus of claim 1 wherein the credential service is further configured to obtain the token from an issuer service.

9. The apparatus of claim 1 wherein the credential service includes functions called by the code, including a function that when invoked instructs the credential service to obtain the token.

10. The apparatus of claim 1, wherein the other set of credential data is stored is the memory.

11. A method comprising:
    calling a credential service from a browser component to determine whether a stored set of credential data previously associated with a website matches requirements for submission to the website, the requirements corresponding to login information;
    responsive to a determination that the set of credential data matches the requirements for submission to the website, calling the credential service to obtain a token corresponding to the credential data for providing to the website; and
    responsive to a determination that the set of credential data does not match the requirements for submission to the website, displaying a credential user interface to create a set of credential data matching the requirements and calling the credential service to obtain a token corresponding to the set of credential data matching the requirements.

12. The method of claim 11 further comprising, instantiating the browser component by processing HTML that corresponds to a page of the website.

13. The method of claim 11 wherein a set of credential data previously associated with a website matches the requirements, and further comprising, displaying a representation of that set of credential data in association with the browser component.

14. The method of claim 11 wherein the credential data does not match the requirements, and further comprising, calling the credential service to find at least one other set of credential data that meets the requirements, and presenting a representation of each other set of credential data that meets the requirements for user selection of another set.

15. The method of claim 14 further comprising, providing an icon that indicates that a set of credential data that meets the requirements is needed, and wherein presenting the representation of each other set of credential data occurs in response to user interaction with the icon.

16. The method of claim 11 further comprising, obtaining the token and submitting the token to the website.

17. The method of claim 16 wherein obtaining the token comprises providing a notification to the website, and in response to the notification, receiving a function call to get the token.

18. A device, comprising:
    at least one processor and a memory;
    wherein the at least one processor is configured to perform actions comprising:
    accessing information associated with a data store that maintains sets of login data to determine whether a stored set of login data previously associated with a website matches requirements set forth in parameters associated the browser component, and if so,
    a) displaying a representation of that set of login data that comprises a tile having a graphic and claims, obtaining a token corresponding to that set of login data, and providing the token to a website, and if not,
    b) creating or searching for other sets of login data that match the requirements, displaying a representation for each set of login data that matches the requirements, receiving interaction with a displayed representation of another set of login data, obtaining a token corresponding to the other set of login data, and providing the token to a website.

19. The device of claim 18, wherein the at least one processor is further configured to perform actions comprising:
    providing a credential user interface.

20. The device of claim 18, wherein accessing the information associated with a data store comprises reading a ledger associated with a card file data store.

* * * * *